United States Patent

Rhudy et al.

[11] 4,008,409
[45] Feb. 15, 1977

[54] DYNAMOELECTRIC MACHINE CORE AND COIL ASSEMBLY

[75] Inventors: Ralph G. Rhudy; Hans H. Casanova, both of Scotia, N.Y.

[73] Assignee: General Electric Company, Schenectady, N.Y.

[22] Filed: Apr. 9, 1975

[21] Appl. No.: 566,454

[52] U.S. Cl. .......................... 310/45; 174/120 SC; 174/127; 336/84
[51] Int. Cl.² ....................................... H02K 15/12
[58] Field of Search ............ 310/179, 180, 45, 184, 310/260, 187, 270, 189, 196, 194, 214, 215; 427/127; 428/244, 266, 268; 336/84 C, 205, 84; 174/117, 117 FF, 117 F, 120, 110, 113, 34, 120 SC, 127

[56] References Cited
UNITED STATES PATENTS

| | | | |
|---|---|---|---|
| 2,427,700 | 9/1947 | Atkinson | 310/196 |
| 3,240,621 | 3/1966 | Flower | 427/127 |
| 3,254,150 | 5/1966 | Rogers | 310/45 |
| 3,327,268 | 6/1967 | Babus | 336/84 C |
| 3,505,729 | 4/1970 | Balke | 310/45 |
| 3,508,096 | 4/1970 | Kull | 310/196 |
| 3,649,744 | 3/1972 | Coleman | 174/117 V |
| 3,723,797 | 3/1973 | Andersson | 174/117 FF |
| 3,750,273 | 8/1973 | Beddows | 310/45 |
| 3,844,834 | 10/1974 | Jerson | 174/120 SC |

FOREIGN PATENTS OR APPLICATIONS 932,013   8/1973   Canada .................. 310/45

*Primary Examiner*—R. Skudy
*Attorney, Agent, or Firm*—Vale P. Myles

[57] ABSTRACT

A dynamoelectric machine core and coil assembly characterized by having a separately insertable conformable side filler, such as resin impregnated fiber glass provided with a plurality of ridges of an electrically semi-conductive, pressure-deformable elastomer bonded to one side thereof. In the assembly the conformable side filler is compressed between the side of a coil-receiving laminated core slot and the relatively smooth sides of coil windings mounted in the slot. As thus compressed, the side filler forms a good thermally conductive path between the somewhat irregular coil sides and the core to thereby prevent undesirable temperature rises. The side fillers also prevent insulation-destroying vibration of the coils in the slots, and due to the semi-conductive nature of the side fillers, they prevent the formation of corona across any voids that might exist between the sides of the coil insulation and the sides of the coil-receiving slots.

7 Claims, 3 Drawing Figures

DYNAMOELECTRIC MACHINE CORE AND COIL ASSEMBLY

BACKGROUND OF THE INVENTION

This invention relates to an improved form of dynamoelectric machine core and coil assembly that facilitates the manufacture of the assembly and any subsequent disassembly thereof that might be necessary for maintenance or repair purposes. In particular, the invention relates to an improved means for transferring heat from the coil windings of a dynamoelectric machine to the laminated core thereof, and to an improved means for limiting destructive vibration of coils in the core slots, in combination with means for preventing the formation of corona between the insulation of the coil windings and the laminated core of such a machine.

It has become fairly common practice in recent years to manufacture dynamoelectric machines, such as electric motors and generators having pre-formed coil windings, with coil winding insulation formed of epoxy resin impregnated insulating materials that are cured to form rigid, or so-called "hard sided" coils. Such epoxy resins are advantageous in that they do not soften once fully cured, so relatively close manufacturing tolerances can be used in designing and manufacturing the machines. On the other hand, it has been found that such hard sided coils tend to present the manufacturer with other problems. For example, due to the inevitable irregularities in the dimensions of the sides of the coil and the irregularities inherent in the laminated structure of the core slots in which the coils are mounted, voids exist between these parts. Such voids make it difficult to prevent the coils from vibrating in the slots when the machine is operated. Such vibration is very undesirable because it frequently causes the coil insulation to be abraded thus causing corona to be developed in high voltage machines that have a steep voltage gradient across the resultant voids. Another drawback inherent in the use of hard sided coils is that voids formed between the relatively irregular coil sides and the core slots form thermal barriers that retard the conduction of heat from the coils to the core laminations. Since the power rating of dynamoelectric machines is partially determined by the ability of the machine to dissipate heat from its coil windings, such thermal barriers are undesirable.

Prior to the present invention the foregoing disadvantages inherent in hard slot dynamoelectric machines were recognized and several solutions had been developed for them. For example, it is a known repair procedure to insert electrically semi-conductive silicone rubber into the interstices between assembled generator coil windings and the sides of core slots, in the manner disclosed and claimed in U.S. Pat. No. 3,824,683, which issued on July 23, 1974, and is assigned to the assignee of the present invention. The use of such loaded silicone rubber is effective, as is explained in that patent, to eliminate the formation of destructive corona in a hard-slot dynamoelectric machine that has been found to have voids between the coil windings and the sides of the core lamination slots, after the machine is assembled.

It is also known in the manufacture of hard-slot dynamoelectric machines to bond ridges of compressible material to the sides of winding coils prior to their insertion into laminated core slots, in order to improve the thermal conductivity between the coil sides and the laminated core. Such an assembly method and resultant dynamoelectric machine structure is disclosed and claimed in Canadian patent number 932,013 which issued on Aug. 14, 1973 and is assigned to Canadian General Electric Company, Ltd. As is pointed out in that Canadian patent, one drawback of the disclosed method and structure is that a considerable force is required to accomplish an interference fit between the coil and the coil slot into which it is inserted. In fact, several expedients are pointed out in the patent for accomplishing the desired interference fits. In that regard, it is suggested that the resin layers bonded to the coils be coated with a thin film of petroleum grease and that the slot walls be sprayed with a liquid fluorocarbon. In addition, in a supplement to the basic disclosure of that patent, it is pointed out that the resin layers bonded to the coil sides can be formed in flexible, triangular shaped ridges to facilitate the insertion of the coils into the coil slots. Beyond those admitted difficulties in utilizing the disclosed assembly, it is apparent that such interference fit might result in tearing or pulling of the resin coatings bonded to the coil sides, so that portions of the coatings might be torn away to form undesirable voids. Moreover, if it becomes necessary to disassemble the coil windings from the machine as is frequently the case for repair operations, it is obvious that such disassembly is rendered difficult due to the heavy interference fit between the bonded resin material and the sides of the coil slots.

A partial solution to the problems of assembly presented by the type of interference fit needed to practice the invention described in the above-identified Canadian patent is afforded by a prior art method of assembly wherein rectangular mats of relatively smooth sided insulating material are painted with electrically conductive paint and positioned adjacent the sides of machine core slots prior to the insertion of coils therein. Such mats tend to largely fill the inevitable clearance voids between the sides of the coils and the irregularities presented by the edges of the laminations that define the core slots. However, due to local variations in coil width, it has been found desirable in practicing this technique for reducing corona to also wedge short pieces of such electrically conductively painted mats into portions of the coil slots where voids are still found after the coil is assembled with the initial mat along its side. Such multi-layered mats have been found to be relatively effective to eliminate the formation of corona in the manufacture of high voltage dynamoelectric machines, but this multiple-layer-mat method is relatively slow and expensive to practice and does not provide as good thermal conductivity between the coils and the core structure as is often desired.

Accordingly, it is a major object of the present invention to provide an improved dynamoelectric machine core and coil assembly that is free of the problems and disadvantages of prior art methods of assembly and structures, as outlined above.

Another object of the invention is to provide an improved dynamoelectric machine core and coil assembly that is relatively easy and economical to manufacture while affording a coil mounting means that can be readily disassembled for repair.

A further object of the invention is to provide a dynamoelectric machine structure having improved electrical grounding and thermal conductivity between the insulated sides of hard coil windings and the sides of core slots in which the coils are mounted.

Still another object of the invention is to provide an improved dynamoelectric machine structure that is capable of manufacture by mass production techniques that enable conformable side fillers for winding coils to be fabricated in large sheets, rather that requiring such fillers to be bonded directly to separate coils as they are installed in a core.

Additional objects and advantages of the invention will be apparent to those skilled in the art from the description of it that follows, considered in connection with the accompanying drawings.

SUMMARY OF THE INVENTION

In one preferred embodiment of the invention a high voltage dynamoelectric machine is provided with a mat or side filler of semi-conducting material positioned in each of the winding slots of the machine. Each of the mats is formed of resin impregnated fiber glass or a similarly hard surfaced semi-conducting material. One side of the mats is covered with a plurality of resilient ridges of an electrically semi-conductive elastomer. In such prior art assemblies, the mats are compressed between the sides of the respective winding slots in which they are positoned and the coils in the slots. The compression of the mats forces the elastomer bonded to the coils to substantially fill any voids between the slot sides and the coils so that corona producing voids are eliminated, and a better heat transmitting path is formed through the mats from the coils to the machine core.

DESCRIPTION OF A PREFERRED EMBODIMENT

Figure 1:
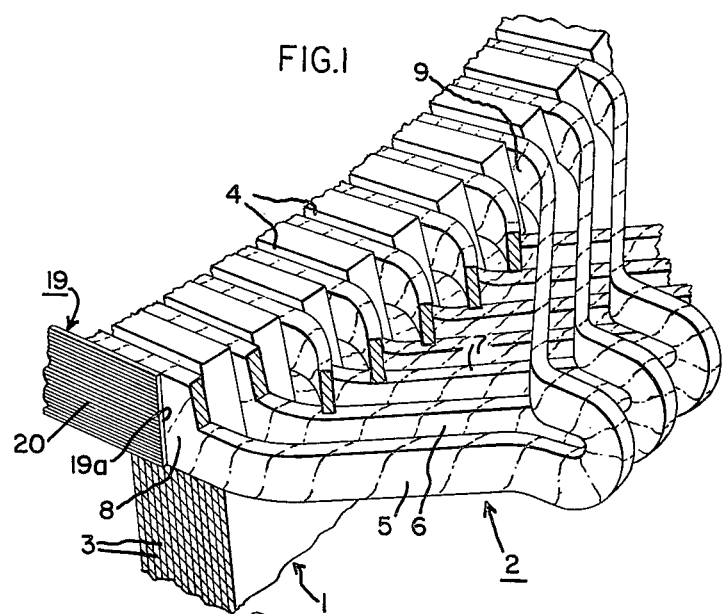
FIG. 1 is a fragmentary perspective view of a portion of a dynamoelectric machine core structure and coil assembly illustrating the present invention.

Referring now to FIG. 1 of the drawings, a preferred embodiment of the invention will be shown as it is applied to a dynamoelectric machine structure such as a relatively conventional electric generator or motor. In FIG. 1 there is shown a portion of a laminated magnetic dynamoelectric machine core 1 and a coil winding assembly 2 mounted thereon. As is conventional, the core 1 is made up of a core stack of magnetic laminations 3 each of which are punched or otherwise formed to define coil-receiving slots 4 therein. In large machines the slots 4 normally extend in an axial direction for several feet but in FIG. 1 the axial extent of the slots 4 and the core stack of laminations 3 is only partially shown to simplify the illustration of the invention. Also, it will be understood that the core and coil arrangement shown in FIG. 1 is a relatively conventional one in which the respective side of the coil are distributed in a winding having a coil span that is approximately one pole pitch.

Figure 2:
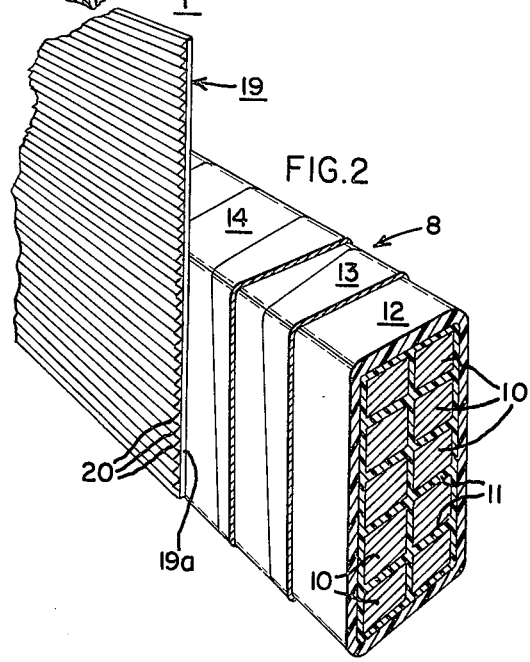
FIG. 2 is a fragmentary perspective view of an enlarged portion of one of the coil sides illustrated in FIG. 1 showing a separable semi-conducting mat having a semi-conductive elastomer bonded to one side thereof, pursuant to the present invention.

Insofar as the present invention is concerned, the respective coils may be formed of either integral bars or of a plurality of turns such as the turns 10 illustrated in FIG. 2, which depicts a portion of the coil side 8 shown in FIG. 1. In this type of coil structure the respective coil turns 10 are insulated from one another by layers of insulation 11 and are completely enclosed in an insulating jacket that is normally formed of layers of micaceous tape 12 and 13 and a layer of armor 14 formed on bonded glass filament, asbestos or other suitable material. In the manufacture of such a multiturn coil the insulating jacket layers are normally applied tightly and as smoothly as possible, then the insulated coil is exposed to successive cycles of vacuum, pressure, and heat, to minimize voids and cure the resin to achieve the desired insulating properties.

When epoxy resins are used to impregnate the jackets of such coils, the resultant layer of coil insulation is relatively hard and smooth, but the coil surfaces will inevitably have small irregularities in their overall surface flatness. These irregularities can create undesirable heat rises as well as being the cause of mechanical vibration of the coils and the source of corona development, when the coil sides are mounted in dynamoelectric machine slots such as the slots 4 of core 1. It is now a common practice to prevent, or attempt to minimize, corona in the voids associated with these irregularities by painting, or otherwise coating, the surface of the portion of the coil which is within the confines of the slot with a semi-conducting resin.

Figure 3:
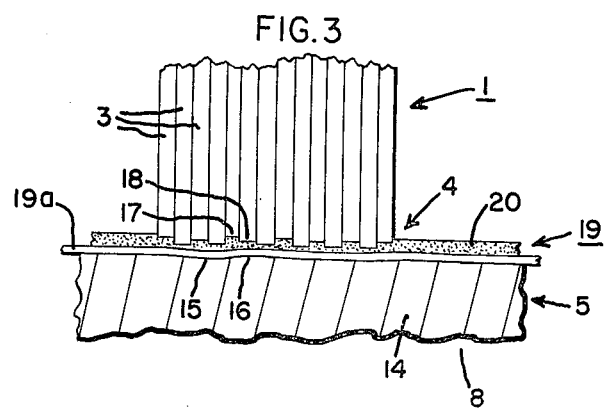
FIG. 3 is a fragmentary plan view, partly in cross-section, of one of the slots and part of one of the coil sides illustrated in FIG. 1 of the drawings.

For the purpose of illustrating the present invention, there is shown in FIG. 3 an enlarged view of the side of coil 5 in relation to a plan view of one side of one of the coil slots 4. As illustrated, the side 8 of coil 5 has variations in its width which are shown in exaggerated form at 15 and 16. Such irregularities limit heat transfer from the coils and they are sometimes sufficient by themselves to cause corona in a high voltage dynamoelectric machine. In most conventional dynamoelectric machines the creation of such undesirable voids is further aggravated by the inevitable irregularities formed in the surfaces of the core slot sidewalls due to the slight misalignment of the respective laminations 3 of the core stack, as is shown in exaggerated form at 17 and 18 in FIG. 3.

In order to provide a means for tightly securing winding coils in core slots so that undesirable temperature rises are avoided and the risk of coil vibration is minimized while at the same time avoiding the formation of corona including voids between the irregularities of the sides of coil windings 5, 6, 7 etc. and the respective sides of coil-receiving slots 4, pursuant to the present invention, the relatively conventional dynamoelectric machine structure disclosed thus far is combined with a plurality of generally flat mats or side fillers of electrically semi-conductive material. One of such mats 19 is illustrated in FIGS. 1, 2 and 3. In a machine constructed pursuant to the present invention, a mat similar to the mat 19 is positioned on one side of each of the respective coil sides in the separate coil-receiving slots 4 of core stack assembly 1.

Each of the mats 19 is formed of a relatively smooth, hard layer of fiber glass 19a that is bonded together with a layer of thermosetting resin or other suitable insulating material. In the preferred embodiment of the invention described herein, the layer of resin bonded glass 19a is made electrically semi-conductive by loading the bonding resin with powdered carbon, graphite or similar conductive particles which are dispersed therein.

The function of the semi-conductive bonding resin is to avoid the development of corona between the relatively smooth hard side 19a of the mat 19 and the smooth hard side of the abutting conductor coil, such as side 8 illustrated in FIG. 2.

Each of the mats, such as mat 19 also has a plurality of ridges 20, as best seen in FIG. 2, formed of electrically semi-conductive, pressure-deformable, room temperature vulcanizing (RTV) silicone rubber that are bonded to one side of the mat 19.

It has been found that various types of elastomeric material are suitable for forming the semi-conductive, resilient ridges 20 on the mat 19, however, in the preferred embodiment of the invention the silicone rubber used is one identified as CRTV-5120, which is a silicone rubber sold by General Electric Company, Waterford, New York. This rubber is loaded with sufficient powdered carbon to give it an electrical resistance within a range of one to one hundred ohm - inches. In the preferred embodiment of the invention the loading of such electrically conductive powder is adjusted to cause the conductivity of the ridges 20 to be in a range of one to ten thousand ohms per square. Those familiar with the manufacture of high voltage dynamoelectric machines will understand that such semi-conductive materials are suitable for the intended purpose of the invention if they are adequately conductive to prevent the formation of corona across any voids that may exist between the sides of coil winding 2 and the sides of coil-receiving slots 4, while being sufficiently high in resistance to prevent appreciable loss due to eddy current flowing between the respective ends of the core stack laminations 3.

In the combined assembly of the present invention, each of the mats (19) is positioned, respectively, one in each of the coil-receiving slots 4 with the rubber-coated, ridged (20) side of each such mat being compressed against the side of a core slot by the coil side (8) mounted therein. Such an arrangement results in the ridges 20 being deformed as best seen in FIG. 3 so that any pre-existing voids caused by the irregularities between the laminations 3 and the irregularities (15 and 16) of the coil sides 8 are completely or at least substantially filled by the semi-conductive rubber 20 and the pressure-deformed mat 19. Thus, the resultant structure forms a good heat transmitting path between the respective sides of the coils and the core stack 1, while also operating to prevent coil vibration and the formation of corona since most of the voids are eliminated and the few remaining voids are electrically short circuited by the semi-conductive resin and the semi-conductive mat 19.

A particular advantage of the combination of the invention disclosed herein is that during the initial assembly of a dynamoelectric machine utilizing the invention each of the mats 19 is first positioned in one of the respective coil-receiving slots 4, before the coil sides are pressed into the slots. Due to the relatively smooth, hard finish of the resin-bonded fiber glass that is thus placed in contact with the side of each coil, it is possible to insert the coils with relative ease and, importantly, no sliding movement is necessary between the ridges 20 of compressible silicone rubber and the side of either the coil slots or the coil sides. Consequently, the resin is not torn or cut during the assembly operation nor is it rolled into ridges which might interfere with coil insertion. Furthermore, should it be necessary to remove the respective coil sides 5, 6, 7, etc., from the core slots 4 relatively little pressure is needed to effect such removal and the mats 19 can be peeled from the core slots without destroying the mats.

In the preferred embodiment of the invention each of the mats 19 is formed to be substantially as wide as the depth of the coil-receiving slot in which it is positioned. The length of the mat 19 is determined such that the respective ends of the mats are spaced between 1 and 5 inches from the ends of the coil-receiving slots in which they are disposed. It has been found that such an arrangement accommodates the normal "dog boning" or enlargement of the ends of the coil sides relative to their mid-portions.

Each of the mats 19 is further characterized by having a thickness in the range of 10 to 20 mils and each of the ridges 20 of silicone rubber on the mats 19 preferably formed in a generally triangular cross-section with the maximum vertical axis of each triangular cross-section being in the range of 30 to 70 mils in height. Such a configuration of the ridges 20 can be achieved by distributing a layer of RTV silicone rubber on the mats 19 and drawing a toothed spreader having triangular shaped teeth over the distributed material to form it into the triangular shaped ridges before it cures. Preferably the resultant ridges are substantially parallel and extend the full length of the mats (19) on which they are bonded. Also, it has been found desirable to space the ridges such that there are approximately 20 ridges per inch of width of each of the mats (19). This structure provides a sufficient amount of resilient, semi-conductive material in the ridges 19 to substantially fill most of the voids normally encountered by the degree of irregularity found in a core stack of laminations and the sides of the insulating jackets on the coil winding while enabling the respective coil sides to be forced into the coil slots without requiring an unduly large amount of inserting pressure.

Finally, in the preferred embodiment of the invention it has been found desirable to mix the silicone rubber bonded to the mat 19 so that it comprises 50 to 80% by weight silicone polymer, loaded with 20 to 30% by weight of carbon powder, with the remainder of the compound comprising conventional filler material.

It will be apparent to those familiar with the manufacture of dynamoelectric machines that various modifications and improvements of the invention may be made without departing from the foregoing teaching of the invention; accordingly, it is our intention to encompass within the appended claims the true spirit and scope of the invention.

What we claim and desire to secure by Letters Patent of the United States is:

1. A dynamoelectric machine core and coil winding assembly comprising a core stack of magnetic metal laminations formed with coil-receiving slots therein, an electrical winding of interconnected coils having their sides disposed, respectively, in said slots and having their end turns extending beyond the ends of the core stack, a rigid coating of insulating material disposed around each coil side to insulate the coils from the core stack, in combination with generally flat mats of semi-conducting material each having a plurality of ridges of electrically semi-conductive, pressure-deformable room temperature vulcanizing silicone rubber bonded to one side thereof, said rubber bonded to the mats comprising 50 to 80 percent by weight silicone rubber loaded with 20 to 30 percent carbon powdered material, said mats being positioned respectively, one in each of said slots with the rubber coated side of each mat compressed against the side of a slot by the coil side mounted therein.

2. An assembly as defined in claim 1 wherein each of said mats is substantially as wide as the depth of the slot in which it is disposed.

3. An assembly as defined in claim 2 wherein each of said mats is formed of fiber glass having a resin coating cured thereon, said resin coating being filled with a conducting material to make the coating electrically semi-conductive 4. An assembly as defined in claim 2 wherein each mat is in the range of 10 to 20 mils thick, and each ridge bonded to said mats is generally triangular in cross-section with the maximum vertical axis of said triangular cross-sections being in the range of 30 to 70 mils in height.

5. An assembly as defined in claim 2 wherein the ends of each of said mats are spaced, respectively, between 1 to 5 inches from the ends of said slot.

6. An assembly as defined in claim 4 wherein the room temperature vulcanizing rubber bonded to the mats comprises 50 to 80% by weight silicone rubber loaded with 20 to 30% by weight carbon powder.

7. An assembly as defined in claim 4 wherein said ridges are substantially parallel and extend the full length of the mat on which they are mounted, there being approximately 20 ridges per inch of width on each mat.

* * * * *